United States Patent Office 3,071,612
Patented Jan. 1, 1963

3,071,612
PHENYL PIMELIC ESTERS AND
THEIR PRODUCTION
Joseph W. Nemec, Rydal, Pa., assignor to Rohm & Haas
Company, Philadelphia, Pa., a corporation of Delaware
No Drawing. Filed Feb. 3, 1961, Ser. No. 86,875
12 Claims. (Cl. 260—475)

This invention deals with specific aromatic compounds, as well as the method for their preparation.

The compounds of the present invention may be represented by the formula

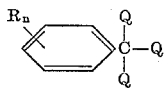

in which R is hydrogen, alkyl of 1 to 4 carbon atoms, or chlorine, $n$ is an integer from 1 to 3, and Q is alkyl of 1 to 4 carbon atoms or the group

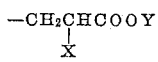

in which X is an alkyl group of 1 to 4 carbon atoms or hydrogen, and Y is an alkyl group of 1 to 8 carbon atoms. The preferred compounds of the present invention are those in which at least two Q's contain an ester group.

Typical embodiments of R include hydrogen, methyl, isopropyl, butyl, and chlorine. Typical embodiments of Q include
methyl,
ethyl,
isopropyl,
butyl,
methoxycarbonylethyl,
ethoxycarbonylethyl,
butoxycarbonylethyl,
octoxycarbonylethyl,
2-methoxycarbonyl-2-methylethyl,
2-butoxycarbonyl-2-methylethyl,
2-ethoxycarbonyl-2-ethylethyl,
2-propoxycarbonyl-2-methylethyl,
2-hexoxycarbonyl-2-propylethyl, and
2-octoxycarbonyl-2-butylethyl.

The products of this invention are made by reacting an aromatic compound having the formula

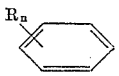

with a tertiary nitro compound having the formula

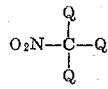

in the presence of a Friedel-Crafts type catalyst. Friedel-Crafts type catalysts are well recognized in the art and include such compounds as aluminum chloride, ferric chloride, stannic chloride, boron trifluoride, boron trifluoride ether complexes, and the like. The preferred catalyst is aluminum chloride.

Typical embodiments of the aromatic reactant include benzene, toluene, xylene, propylbenzene, butylbenzene, dibutylbenzene, chlorobenzene, chlorotoluene, chloroxylene, and the like.

Typical embodiments of the nitro compound include
methyl γ-nitro isocaproate,
ethyl γ-nitro isocaproate,
butyl γ-nitro isocaproate,
methyl α-methyl-γ-nitro isocaproate,
ethyl α-methyl-γ-nitro isocaproate,
methyl γ-nitro-γ-methylhexoate,
ethyl γ-nitro-γ-ethylhexoate,
ethyl γ-nitro-α,γ-dimethylhexoate,
dimethyl γ-nitro-γ-methylpimelate,
diethyl γ-nitro-γ-methylpimelate,
dipropyl γ-nitro-γ-methylpimelate,
dimethyl γ-nitro-γ-propylpimelate,
diethyl γ-nitro-γ-propylpimelate,
dipropyl γ-nitro-γ-propylpimelate,
dimethyl α,α,γ-trimethyl γ-nitropimelate,
diethyl α,α,γ-trimethyl γ-nitropimelate,
dibutyl α,α,γ-trimethyl γ-nitropimelate,
tris(2-methoxycarbonylethyl)nitromethane,
tris(2-butoxycarbonylethyl)nitromethane,
2-nitro-2-methylpropane,
2-nitro-2-ethylpropane,
2-nitro-2-ethylhexane, and
2-nitro-2-butyloctane.

The present reacton is conducted by adding the nitro compound to a mixture of the aromatic reactant and the Friedel-Crafts type catalyst, although the particular order of addition of reactants and catalyst is not especially critical. For optimum results, it is desirable to use an excess of catalyst. If one of the Q groups represents an ester, then it is preferred to employ three moles of catalyst for each mole of alkylating agent. For each additional Q group that represents an ester, an additional mole of catalyst is employed to effect optimum conversions. That is, for one Q group that represents an ester group, three moles of catalyst are recommended. If two Q groups are esters, four moles of catalyst are recommended, and if all three Q groups are esters, then five moles of catalyst are recommended. In the cases wherein the alkylating agent contains no ester function, that is, where the Q groups are alkyl, then it is preferred to employ one to two moles of catalyst for each mole of nitro-containing reactant. There is no apparent advantage in using larger than the recommended amounts of catalyst. Lesser amounts of catalyst may be employed but generally there is some reduction in yield of the desired product.

The reaction is conducted in a temperature range of about 15° to 60° C., preferably 25° to 40° C. It is preferred to have a fluid reaction system and generally an excess of the aromatic component is used as a solvent or diluent for the reaction mixture. If desired, other solvents may be employed. These, of course, should be inert, organic, and volatile, such as nitrobenzene, carbon disulfide, and petroleum ether, among others.

The products of the present invention may be isolated by treating the reaction mixture with cold, diluted mineral acid, such as hydrochloric, sulfuric, and the like, separating the organic layer and distilling. It is possible to form the corresponding salts of the ester products by saponification with sodium hydroxide, potassium hydroxide, ammonium hydroxide, and the like. The corresponding acids can be prepared by acidification of the aforementioned salts, such as with hydrochloric acid, sulfuric acid, and the like. The salts of the acids of the ester products, as well as the acids themselves, are within the gamut of this invention.

The products of this invention are useful as plasticizers for materials, such as polyvinyl chloride. The acids or lower alkyl esters of the present invention may be esterified or transesterified with alcohols, such as butyl, 1-methylheptyl, 2-ethylhexyl, hexyl, isooctyl, octyl, nonyl, and 2-ethylhexyl to produce high-boiling esters which are particularly useful agents to provide softening and pliable properties to resins, such as polyvinyl chloride, when incorporated therein in the usual amounts. The choice of the alkyl group contributed by the alcohol depends in part on the number of carboxyl groups present, as will be understood by one skilled in the art. Of particular utility are those esters containing as the Q component two or three carboxyl functions, since these impart good low temperature flexibility and heat stability to the compounded resins, such as polyvinyl chloride. Examples of these materials of especial value are:

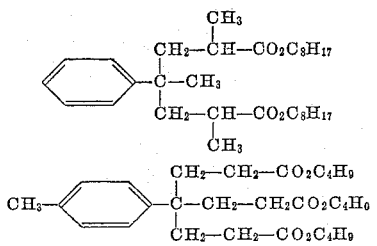

and

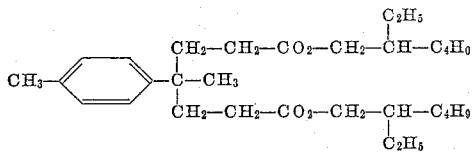

These are prepared directly as indicated in following Examples 4, 6 and 7 or made as lower alkyl esters and then transesterified with the appropriate alcohol. The compounds of the present invention which contain two or three carboxylic functions are valuable components in the preparation of polymers, such as polyesters by reaction with ethylene glycol, propylene glycol, or the like.

The products of the present invention, as well as the method for making them, may be more fully understood from the following examples, which are offered by way of illustration and not by way of limitation. Parts by weight are used throughout.

*Example 1*

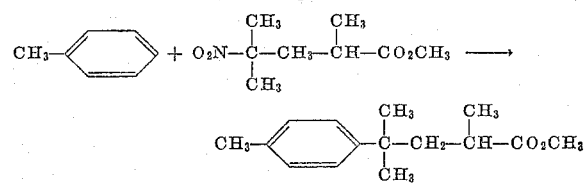

To a mixture of 1000 parts (7.5 moles) of AlCl$_3$ and 500 ml. of toluene is added dropwise 473 parts (2.5 moles) of methyl α-methyl-γ-nitroisocaproate over a period of one hour at 30° to 38° C. The resulting mixture is maintained at 38° to 42° C. for 4¼ hours and then poured onto a mixture of ice and hydrochloric acid. The organic layer is separated and washed twice with water. Distillation of the organic layer under reduced pressure gives as the main fraction 366 parts of methyl α-methyl-γ-phenylisocaproate, which distills at 103° to 107° C. at 0.9 mm. absolute pressure; $n_D^{20}$ 1.4947.

The product contains 76.13% carbon (theoretical 76.92%), and 9.36% hydrogen (theoretical 9.40%).

A sample of the product is converted to α-methyl-γ-phenylisocaproic acid by saponification with alcoholic potassium hydroxide followed by acidification of the cooled hydrolysis solution with hydrochloric acid. The crude acid is recrystallized from methanol to give a white solid which melts at 59° to 61° C.

The product contains 76.53% carbon (theoretical 76.36%) and 9.08% hydrogen (theoretical 9.09%). It has a neutral equivalent of 221 (theoretical 220).

*Example 2*

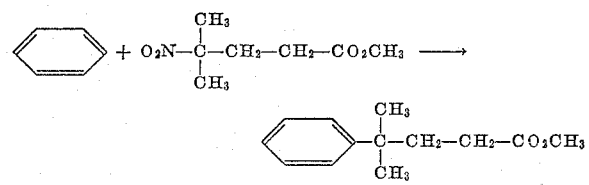

To an agitated mixture of 400 parts (3.0 moles) of AlCl$_3$ and 500 ml. of benzene is added 175 parts (1.0 mole) of methyl γ-nitroisocaproate over a period of ¾ hour at 26° to 32° C. After the addition is complete, agitation of the mixture is continued for 5¼ hours at ambient temperature. The reaction mixture is then added immediately to a mixture of ice and hydrochloric acid. The oil layer is separated and washed with two 500 ml. portions of water. The washed material is stripped at 25 mm. to remove the excess benzene and the remaining oil distilled under reduced pressure to give 153 parts of methyl γ-phenylisocaproate which distills at 77° to 79° C. at 0.1 mm. absolute pressure; $n_D^{20}$ 1.5012.

The product contains 75.73% carbon (theoretical 75.72%) and 8.80% hydrogen (theoretical 8.74%). It has a saponification number of 272 (theoretical 255).

A sample of the product is saponified with alcoholic sodium hydroxide followed by acidification with hydrochloric acid to give γ-phenyl-isocaproic acid; boiling point 114° C. at 0.02 mm. absolute pressure.

The product contains 75.24% carbon (theoretical 75.00%) and 8.31% hydrogen (theoretical 8.33%). It has a neutral equivalent of 193 (theoretical 192).

*Example 3*

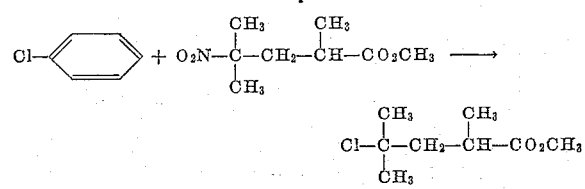

To an agitated slurry of 266 parts (2.0 moles) of AlCl$_3$ in 300 ml. of chlorobenzene is added 122 parts (0.65 mole) of methyl α-methyl-γ-nitroisocaproate over a period of ¾ hour at 32° to 37° C. The resulting reaction mixture is agitated at ambient temperature for 28 hours after which it was poured onto a mixture of ice and hydrochloric acid. The organic layer is separated and washed twice with dilute hydrochloric acid and then twice with water. The washed material is dried over calcium chloride and then distilled under reduced pressure to give 114 parts of methyl α-methyl-γ-(p-chlorophenyl)-isocaproate which distills at 93° to 95° C. at 0.25 mm. absolute pressure; $n_D^{25}$ 1.5067.

The product contains 65.95% carbon (theoretical 66.01%) and 7.49% hydrogen (theoretical 7.47%).

A mixture of 51 parts (0.2 mole) of the above product and 12 parts (0.3 mole) of sodium hydroxide in 50 ml. of 70% ethanol is heated at reflux for ½ hour. The cooled reaction mixture is diluted with 60 ml. of water and then acidified with concentrated hydrochloric acid. The solid which forms is washed with water and then recrystallized from 50% ethanol to give α-methyl-γ-(p-chlorophenyl)-isocaproic acid as white crystals which melts at 74° to 75° C.

The product contains 64.60% carbon (theoretical 64.86%) and 7.19% hydrogen (theoretical 7.07%).

*Example 4*

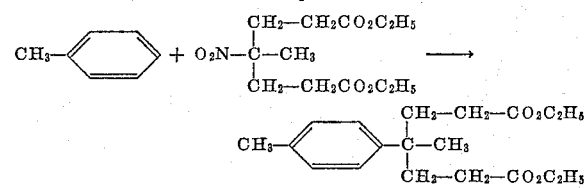

To an agitated mixture of 600 ml. of toluene and 433 parts (3.25 moles) of AlCl$_3$ is added 296 parts (1.08 moles) of diethyl γ-methyl-γ-nitropimelate over a period of 1½ hours at 33° to 38° C. The resulting mixture is then maintained with agitation at 28° to 32° C. for 16 hours. The mixture is then poured onto a mixture of ice and hydrochloric acid. The organic layer is separated and washed with dilute hydrochloric acid and then with water. The washed material is stripped to remove the excess toluene and the residue is distilled under reduced pressure to give 256 parts of diethyl γ-methyl-γ-(p-tolyl)-pimelate. The material distills at 146° to 147° C. at 0.08 mm. absolute pressure; $n_D^{24}$ 1.4945.

The product contains 69.25% carbon (theoretical 71.10%) and 8.70% hydrogen (theoretical 8.74%).

A sample of the product, 148 parts (0.46 mole), is saponified by refluxing for four hours with 48 parts (1.2 mole) of sodium hydroxide in 200 ml. of 50% ethanol. The resulting solution is acidified with hydrochloric acid and the resulting solid is recrystallized from xylene to give 115 parts white crystalline γ-methyl-γ-(p-tolyl)-pimelic acid which melts at 132° to 132.5° C.

The product contains 68.12% carbon (theoretical 68.15%) and 7.63% hydrogen (theoretical 7.58%).

*Example 5*

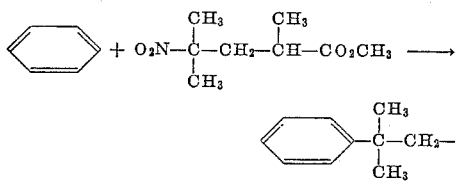

To an agitated mixture of 400 parts of benzene and 400 parts (3.0 moles) of AlCl₃ is added 200 parts (1.0 mole) of methyl α-methyl-γ-nitroisocaproate over a period of 1½ hours at 30° to 35° C. The resulting mixture is then agitated at 35° to 40° C. for one hour and then poured onto a mixture of hydrochloric acid and ice during which time oxides of nitrogen are evolved. The organic layer is separated and washed with dilute hydrochloric acid and then with water. The washed material is stripped to remove excess benzene and the residue distills under reduced pressure to give 167 parts of methyl α-methyl-γ-phenylisocaproate. The material distills at 91° to 94° C. at 0.5 mm. absolute pressure; $n_D^{25}$ 1.4942. The product has a saponification number of 253 (theoretical 255).

The product contains 76.17% carbon (theoretical 76.36%) and 9.09% hydrogen (theoretical 9.15%).

A sample of the product is saponified with dilute caustic followed by acidification with hydrochloric acid to produce α-methyl-γ-phenylisocaproic acid. The solid is recrystallized from ethanol to give white crystals melting at 51° to 52° C.; acid number 204 (theoretical 206).

The product contains 75.77% carbon (theoretical 75.75%) and 8.74% hydrogen (theoretical 8.74%).

*Example 6*

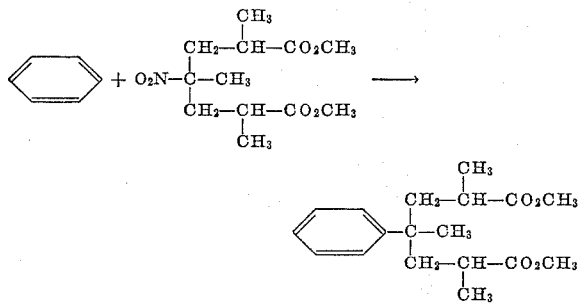

To an agitated mixture of 500 ml. of benzene and 400 parts (3.0 moles) of AlCl₃ is added 175 parts (0.64 mole) of dimethyl α,α,γ-trimethyl-γ-nitropimelate over a period of two hours while maintaining the reaction temperature at 22° to 26° C. with cooling. The resulting reaction mixture is agitated for three hours at 26° to 30° C. and then poured onto a mixture of hydrochloric acid and ice. The organic layer is separated and washed with dilute hydrochloric acid and then with wather. The washed material is distilled under reduced pressure to give 148 parts of dimethyl α,α′,γ-trimethyl-γ-phenylpimelate which distills at 126° to 127° C. at 0.1 mm. absolute pressure; $n_D^{25}$ 1.4950.

The product contains 70.55% carbon (70.59% theoretical) and 8.51% hydrogen (theoretical 8.55%).

A 50 part sample of the product is converted to α,α′,γ-trimethyl-γ-phenylpimelic acid by refluxing for one hour with 40 parts of sodium hydroxide in 70% ethanol followed by acidification with hydrochloric acid. The resulting solid, after recrystallization from xylene, melts at 173° to 174° C.

The product contains 69.10% carbon (theoretical 69.10%) and 8.14% hydrogen (theoretical 7.92%). It has an acid number of 280 (theoretical 278).

*Example 7*

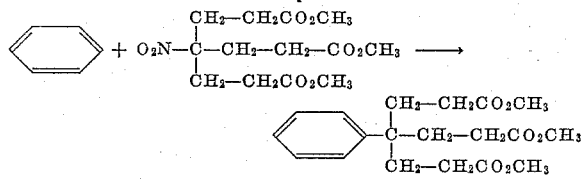

To a stirred mixture of 667 parts (5.0 moles) of AlCl₃ and 1 liter of benzene is added 319 parts (1.0 mole) of tri-(methyl-β-carboxyethyl)nitromethane over a period of seven hours at 35° to 45° C. The resulting mixture is agitated for two hours and then allowed to stand for 16 hours at ambient temperature. The reaction mixture is then poured into a mixture of ice and hydrochloric acid. The organic layer is separated and is washed twice with dilute hydrochloric acid and twice with water. The washed material is dried over calcium chloride and then stripped under reduced pressure to remove the excess benzene. The residue is then vacuum distilled to give a major cut (173 parts) of essentially pure tri(methyl-β-carboxyethyl) toluene which distills at 201° to 207° C. at 0.9 mm. absolute pressure; $n_D^{25}$ 1.5060.

The product contains 64.66% carbon (theoretical 65.14%) and 7.32% hydrogen (theoretical 7.43%).

*Example 8*

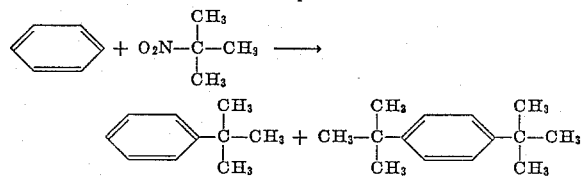

To a mixture of 67 parts (0.5 mole) AlCl₃ and 150 ml. of benzene is added 103 parts (1.0 mole) of t-nitrobutane over a period of one hour at 20° to 30° C. The mixture is maintained at 40° to 43° C. for two hours and then poured onto a mixture of ice and hydrochloric acid. The oil layer is separated from some tarry material and is distilled to give 15 parts of t-butylbenzene which distills at 50° to 53° C. at 10 mm. absolute pressure: $n_D^{20}$ 1.4919. There is also isolated six parts of p-di-t-butylbenzene (melting point 76° to 77° C.) by recrystallization of the distillation residue. Infrared examination indicated that, in addition to the above-identified products, a mixture of alkylated benzene components is formed.

I claim:
1. A compound having the formula

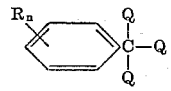

in which R is a member from the group consisting of hydrogen, alkyl of 1 to 4 carbon atoms and chlorine, n is an integer from 1 to 3 and Q is a member from the group consisting of alkyl of 1 to 4 carbon atoms and the group

in which X is selected from the group consisting of hydrogen and alkyl of 1 to 4 carbon atoms and Y is alkyl of 1 to 8 carbon atoms, at least two of the Q's must contain ester groups.

2. A compound having the formula

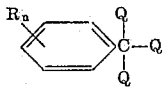

in which R is alkyl of 1 to 4 carbon atoms, $n$ is an integer from 1 to 3, and Q is the group $$-CH_2CHCOOY$$
$$\quad\;\; |$$
$$\quad\;\; X$$

in which X is alkyl of 1 to 4 carbon atoms, and Y is alkyl of 1 to 8 carbon atoms.

3. The compound, diethyl γ-methyl-γ-(p-tolyl)-pimelate.

4. The compound, dimethyl α,α'-γ-trimethyl-γ-phenyl-pimelate.

5. The compound,

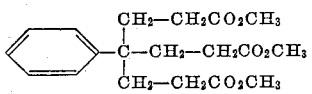

6. The compound,

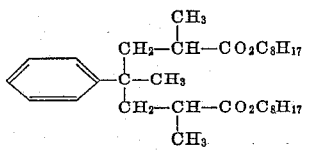

7. The compound,

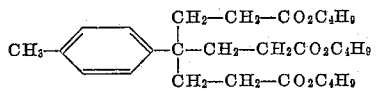

8. The compound,

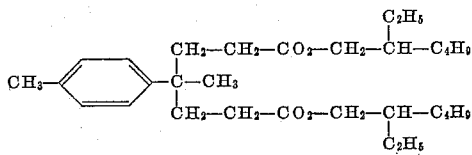

9. A method for the preparation of a compound having the formula

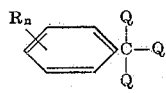

in which R is a member from the group consisting of hydrogen, alkyl of 1 to 4 carbon atoms and chlorine, $n$ is an integer from 1 to 3 and Q is a member from the group consisting of alkyl of 1 to 4 carbon atoms and the group $$-CH_2CHCOOY$$
$$\quad\;\; |$$
$$\quad\;\; X$$

in which X is selected from the group consisting of hydrogen and alkyl of 1 to 4 carbon atoms and Y is alkyl of 1 to 8 carbon atoms, which comprises reacting at a temperature of about 15° to 60° C. in the presence of a Friedel-Crafts catalyst, the compounds having the formulas

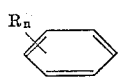

and

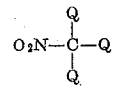

10. A method according to claim 9 in which the temperature is about 25° to 40° C.

11. A method according to claim 9 in which one additional mole of catalyst is employed for each of the Q groups that represents an ester.

12. A method according to claim 9 in which two of the Q's contain ester groups and at least four moles of catalyst is employed per mole of the nitro compound.

References Cited in the file of this patent

Horning et al.: J. Am. Chem. Soc., 70, 2945 (1948).
D'Alelio: Fundamental Principles of Polymerization (New York, 1952), p. 149.